United States Patent [19]
Colizza

[11] Patent Number: 5,805,055
[45] Date of Patent: Sep. 8, 1998

[54] ANTITHEFT SYSTEM INTEGRATED WITH FUNCTIONS OF SECURITY, INFORMATION AND NAVIGATION, BASED ON ELECTRONIC CARTOGRAPHY, VOCAL SYNTHESIS AND RADIO TELECOMMUNICATION

[75] Inventor: Michele Colizza, Zoagli, Italy

[73] Assignee: Elementare Watson S.r.l., Campi Bisenzio, Italy

[21] Appl. No.: 362,541

[22] PCT Filed: May 10, 1994

[86] PCT No.: PCT/IT94/00058

§ 371 Date: Feb. 13, 1995

§ 102(e) Date: Feb. 13, 1995

[87] PCT Pub. No.: WO94/26567

PCT Pub. Date: Nov. 24, 1994

[30] Foreign Application Priority Data

May 11, 1993 [IT] Italy ................................ BO93A0208

[51] Int. Cl.⁶ .................................................. B60R 25/10
[52] U.S. Cl. .......................... 340/426; 340/428; 340/430; 307/10.2; 180/287; 379/44; 379/51; 379/59; 342/357; 342/457
[58] Field of Search ..................................... 340/426, 428, 340/430, 425.5; 307/10.2, 10.3, 10.4, 10.5, 10.6; 180/287; 379/44–59; 342/357, 457

[56] References Cited

U.S. PATENT DOCUMENTS

| 4,189,708 | 2/1980 | Fongell ..................................... 340/426 |
| 4,651,157 | 3/1987 | Gray et al. . |
| 4,750,197 | 6/1988 | Deuekamp et al. ........................ 379/58 |
| 4,864,277 | 9/1989 | Goodman ................................. 340/539 |
| 4,940,964 | 7/1990 | Dao . |
| 4,965,550 | 10/1990 | Wroblewski ............................. 340/524 |
| 5,027,104 | 6/1991 | Reid . |
| 5,119,102 | 6/1992 | Barnard .................................. 342/357 |
| 5,223,844 | 6/1993 | Mansee et al. ........................... 342/357 |
| 5,225,842 | 7/1993 | Brown et al. ............................. 342/357 |
| 5,329,577 | 7/1994 | Norimatsu ................................. 379/58 |
| 5,389,934 | 2/1995 | Kass ........................................ 342/357 |
| 5,418,537 | 5/1995 | Bird ......................................... 342/357 |
| 5,463,595 | 10/1995 | Rodnall et al. .......................... 340/426 |
| 5,490,200 | 2/1996 | Snyder et al. ............................. 379/57 |
| 5,497,149 | 3/1996 | Fast ........................................ 340/426 |
| 5,504,491 | 4/1996 | Chapman ................................. 342/357 |
| 5,515,043 | 5/1996 | Bernard et al. .......................... 340/426 |
| 5,515,285 | 5/1996 | Gannett ................................... 340/426 |
| 5,550,551 | 8/1996 | Alesio ..................................... 342/457 |
| 5,557,254 | 9/1996 | Johnson et al. .......................... 340/426 |
| 5,559,491 | 9/1996 | Stadler .................................... 340/426 |
| 5,576,716 | 11/1996 | Sadler et al. ............................. 342/357 |

FOREIGN PATENT DOCUMENTS

| 0 242 099 | 10/1987 | European Pat. Off. . |
| 0 350 325 | 1/1990 | European Pat. Off. . |
| WO 90/03899 | 4/1990 | WIPO . |
| WO 93/05490 | 3/1993 | WIPO . |
| WO 93/16452 | 8/1993 | WIPO . |

*Primary Examiner*—Thomas Mullen
*Assistant Examiner*—Niua Tong
*Attorney, Agent, or Firm*—McAulay Fisher Nissen Goldberg & Kiel, LLP

[57] ABSTRACT

An antitheft system installed on a motor vehicle has an electronic control unit connected to a localization information detector and to a telephone apparatus, so that the control unit can produce a voice message and then transmit it directly to the police and/or to a security organization by means of the telephone apparatus, when a plurality of sensors detect certain conditions such as the theft of the vehicle. The message may also be sent by the system to a person authorized to use the motor vehicle by means of a transmitter-receiver radio and a portable transceiver radio. Voice messages are contained in a first mass memory unit, localization information derived from a second mass memory unit, the message selected on the basis of satellite signals received and decoded by the system.

56 Claims, 4 Drawing Sheets

ANTITHEFT SYSTEM INTEGRATED WITH FUNCTIONS OF SECURITY, INFORMATION AND NAVIGATION, BASED ON ELECTRONIC CARTOGRAPHY, VOCAL SYNTHESIS AND RADIO TELECOMMUNICATION

TECHNICAL FIELD

The present invention is related to the technical field concerning automatic supervision and security devices, that can be attached to transport means in general and to motor vehicles in particular.

More precisely, the present invention is concerned with a motor vehicle antitheft system integrated with functions of security, localization and navigation of the same motor vehicle.

BACKGROUND ART

Nowadays, there are many types of antitheft systems for motor vehicles, but generally they can be subdivided in two categories: the antitheft systems acting in a limited range and the antitheft systems acting in a wider range.

The first group includes antitheft systems which signal automatically tampering or anomalous use of the motor vehicle in a limited environment surrounding the same motor vehicle.

In other words, these antitheft systems, attached to motor vehicles, signal either acoustically or visually fraudulent use of motor vehicles by persons considered "unauthorized", because they have not deactivated the same antitheft system.

The main disadvantage of this type of antitheft systems results just from their peculiar characteristic, i.e. their limited range of action, of dozens or hundreds meters, either for signalling the tampering into the vehicle or the activation or deactivation of the same antitheft system.

Another disadvantage of this type of antitheft systems is that, in order to function, they must be first activated by an "authorized" person.

The other group of antitheft system comprises the antitheft system for motor vehicle that signal "unauthorised" tampering of the motor vehicle up to a distance of some kilometers from the same motor vehicle.

Such antitheft system are provided with a transmitter-receiver unit on radio frequency that can produce and transmit an alarm signal that can be received and recognized by an operative station, on the same radio frequency and designed to distant monitoring of possible thefts of the load stored in the motor vehicle or its part, or theft of the same motor vehicle.

Such alarm signal is transmitted by the antitheft system set up on the vehicle only if preestablished conditions for recognizing the theft occur.

The most common conditions that activate the antitheft system for motor vehicle are first of all subjected to the previous voluntary activation by the motor vehicle driver's by means of a special key either mechanical or electronic (remote control key, magnetic card, and the like).

Most often the antitheft system is activated when one of the motor vehicle doors is opened or when the same motor vehicle is started.

The biggest disadvantage of this type of antitheft system derives from its limited some kilometer dozens action range, therefore the motor vehicle can be monitored only in the city area or anyway, in a limited zone of national territory.

Further disadvantage of this type of antitheft system results from the necessity to prepare a stationary check room that is able to talk to the mobile unit of the antitheft system installed on the motor vehicle.

The management cost of such a stationary check room is high what, added to the initial cost and the management cost of this type of antitheft system, makes it extremely expensive.

Another disadvantage of "zone" covering antitheft systems of this type derives from the fact that they can be easily dodged, since the "authorized" person could be forced by an ill-intentioned person to deactivate the antitheft system by inserting the proper mechanical or electronic key.

Still further inconvenience of both the above presented types of antitheft system lies in activation and deactivation of the antitheft system.

In fact, such an action must be always performed by a person authorized to use the motor vehicle who, moreover, must be always very near the same or, at most, some kilometers from the motor vehicle, for limited range antitheft systems and those wider range antitheft systems, respectively.

DISCLOSURE OF THE INVENTION

The main scope of the present invention is to provide an antitheft system for motor vehicles that recognizes, independently or through a distant polling, the conditions determining the theft and that is capable to produce and transmit the alarm signal.

Further object of the present invention is to provide an antitheft system capable to signal alarm either near the motor vehicle or within the range of some kilometers, or also in such a range that the antitheft system signal can be caught over the whole national territory.

Another important object of the invention is to provide an antitheft system capable to signal alarm to the public security organizations, therefore avoiding a stationary station dedicated thereto and on work the whole day long.

Still further object of the present invention is to provide an antitheft system integrated with security functions either for the driver or for the same motor vehicle.

Next object of the present invention is to provide an "intelligent" antitheft system capable to issue, when requested, general and navigation information either to the driver or to a possible stationary check station.

The above stated objects are obtained with an antitheft system that is integrated with functions of security, information and navigation based on electronic cartography, vocal synthesis and radio telecommunication, this system being partially placed in a box-shaped casing 12 and fastened to a motor vehicle 2.

The antitheft system according to the invention comprises the following means:
  a localization information detector provided with at least a first antenna;
  a telephone apparatus provided with at least a second antenna;
  a plurality of sensor equipped devices, subdivided in a first group of sensors, which are external to the said box-shaped casing, and a second group of sensors which are internal to the same box-shaped casing, these sensor equipped devices having the task of detecting determined conditions;
  a series of mass memory units;

an electronic unit, connected functionally to said means, for controlling the latter as well as for controlling signals respectively received and sent;

an independent power feeding section for feeding the electronic unit and said means.

BRIEF DESCRIPTION OF THE DRAWINGS

The characteristics of the present invention are pointed out in the following, with reference to the enclosed drawings, in which.

BEST MODES OF CARRYING OUT THE INVENTION

Figure 1:
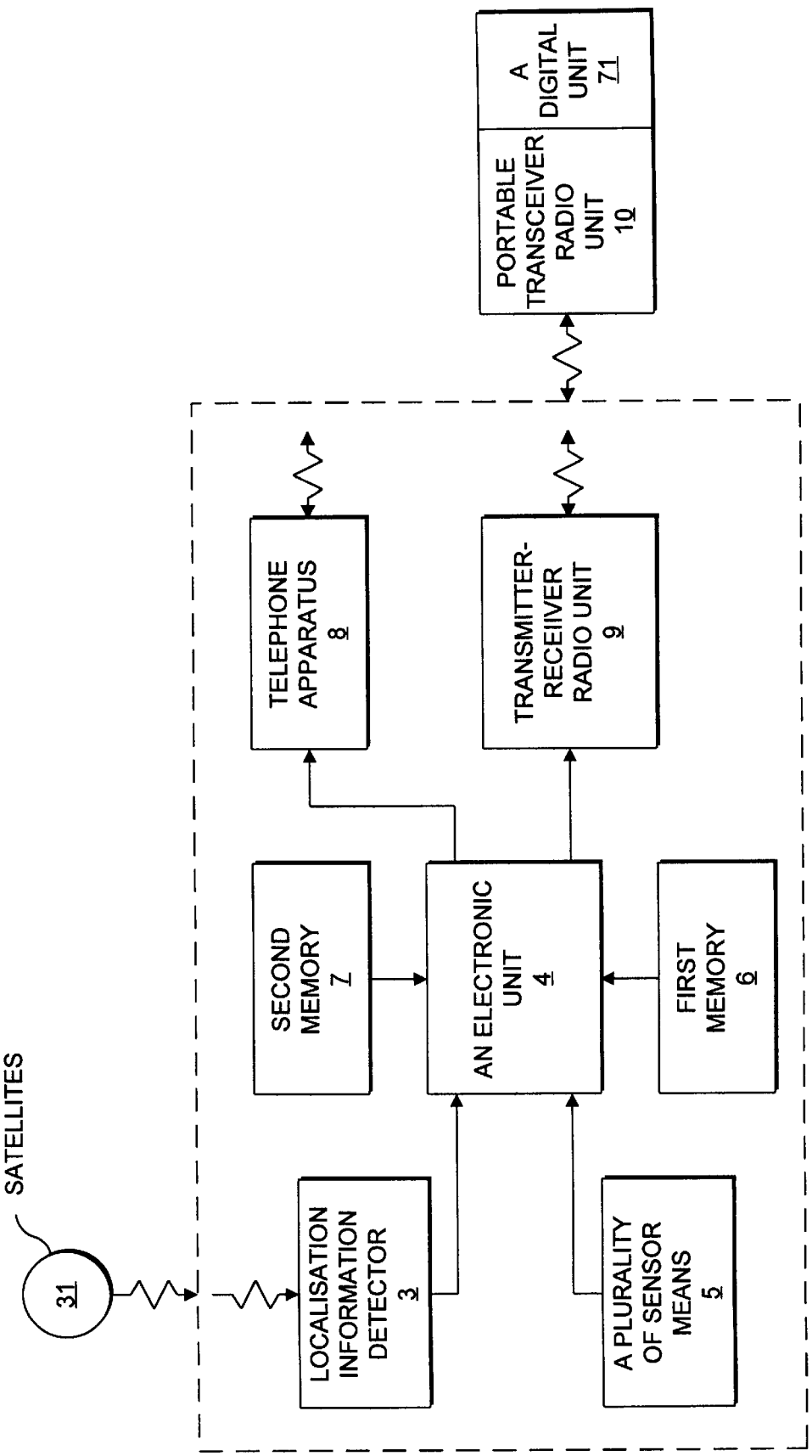
FIG. 1 schematically represents, by means of a block diagram, of the operation of the antitheft system being the subject of the present invention.

With reference to FIG. 1, the reference number 1 indicates an antitheft system integrated with functions of security, information and navigation, and based on electronic cartography, vocal synthesis and radio telecommunication.

Figure 2:
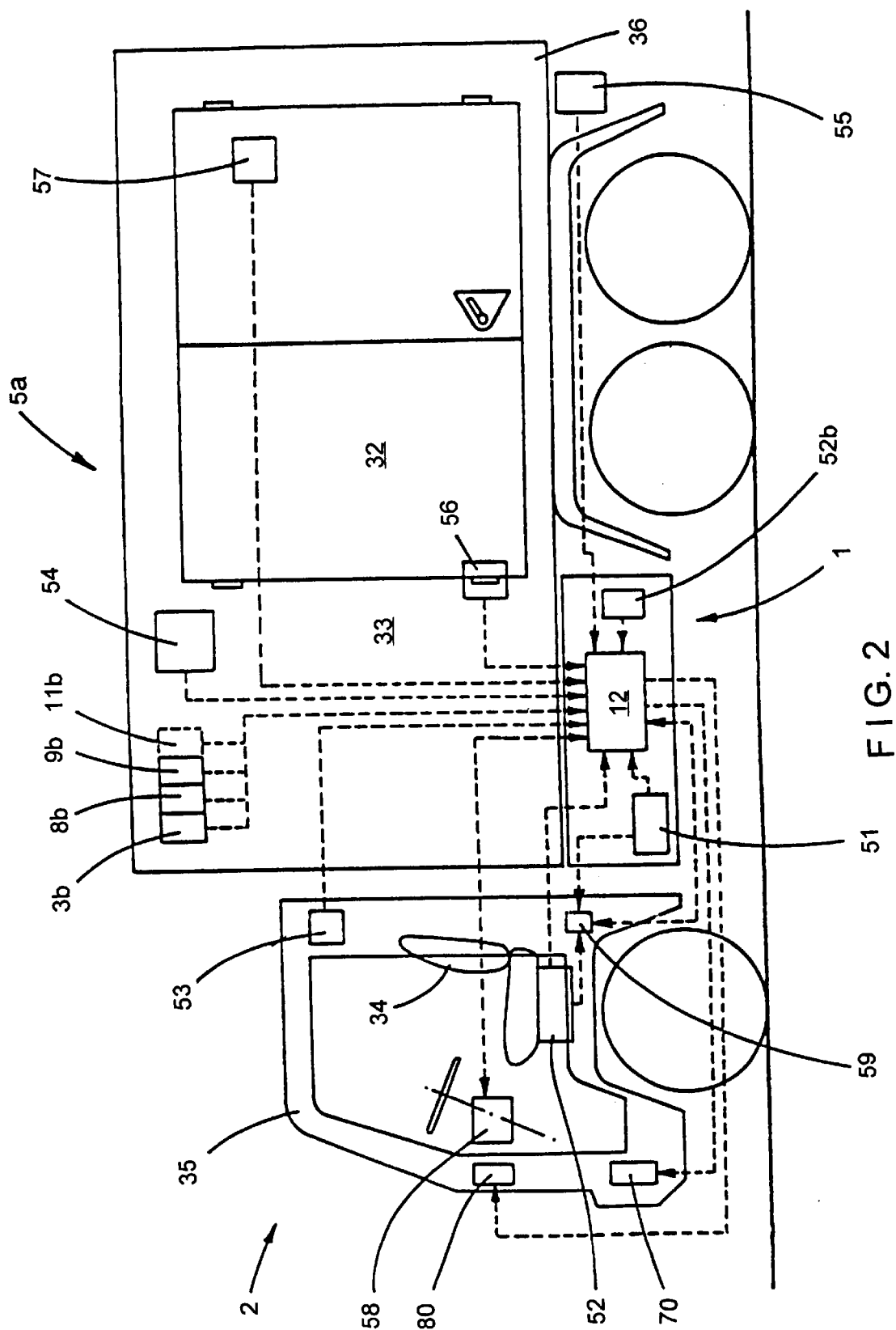
FIG. 2 is a schematic view showing the dislocation of sensor means equipped devices of the antitheft system, in a motor vehicle.

The system 1, partially housed in a box shaped casing 12, can be fastened to a motor vehicle 2, such as the lorry 2 shown in the FIG. 2 and provided with a driver cab 35 and a container body 33.

Figure 3:
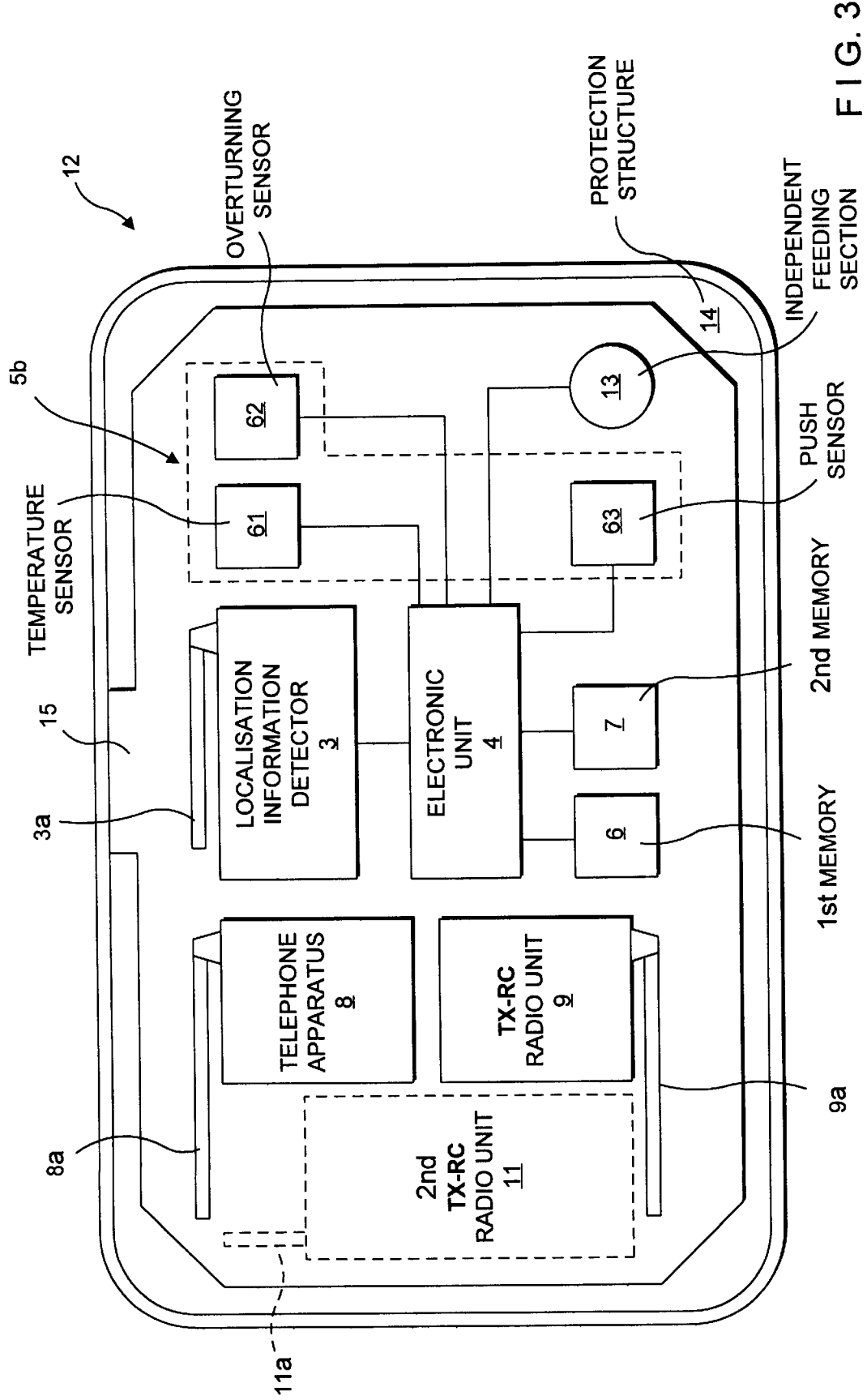
FIG. 3 shows a cross section of the principal component of the antitheft system.
Figure 4:
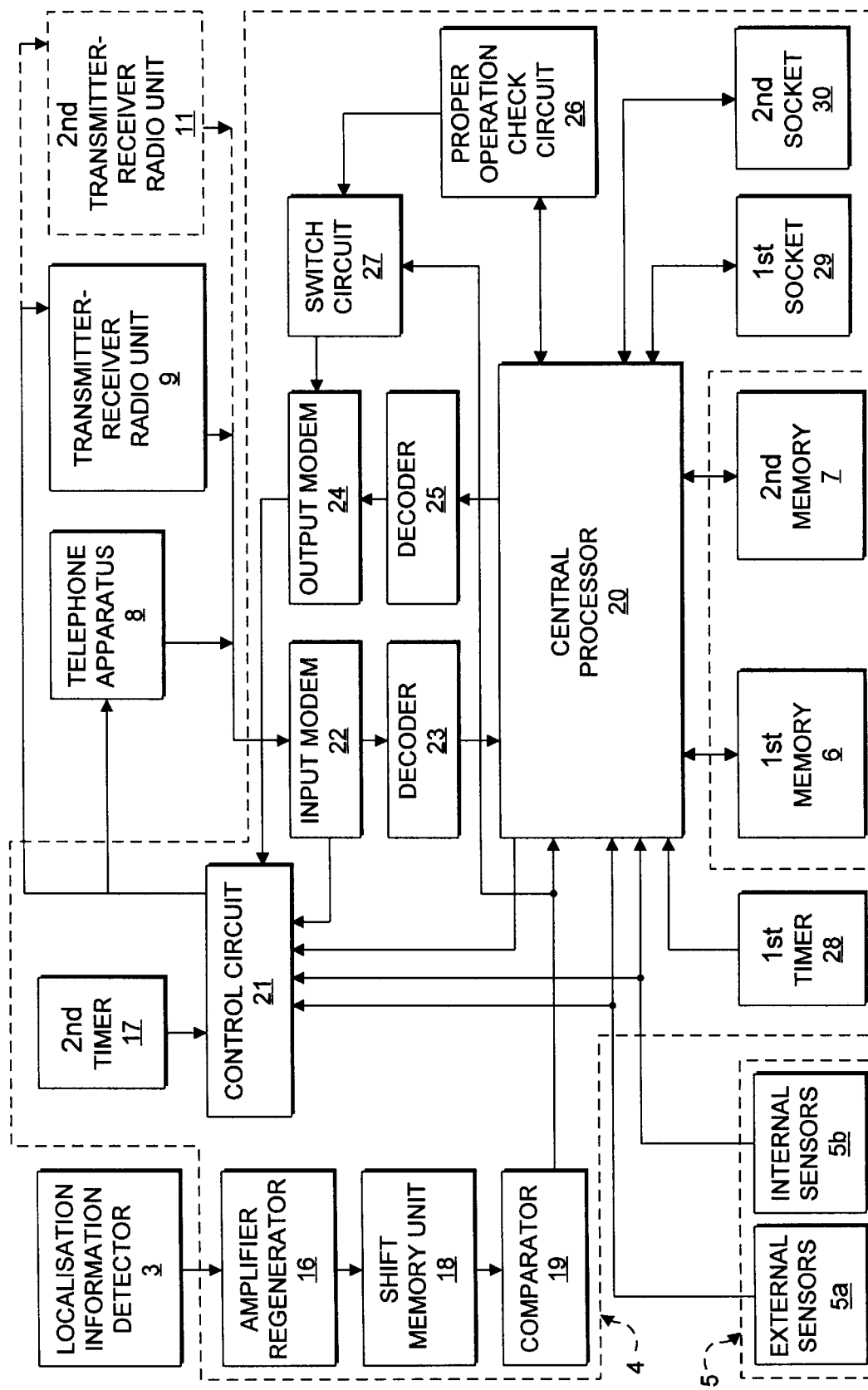
FIG. 4 shows a diagram representing functional connections between the different means forming the antitheft system.

With reference to FIGS. 1, 3 and 4, the system 1 basically consists of a localization information detector, a telephone apparatus 8, a transmitter-receiver radio 9, a plurality of sensor means equipped devices 5, subdivided in a first group of sensors, which are external in respect to the mentioned box-shaped casing 12, and in a second group 5b of sensors internal in respect to the same boxshaped casing 12, an independent feeding section 13 and an electronic unit 4 for control and management of all the above mentioned devices and respective received and transmitted signals.

The localization information detector 3, commonly known as G.P.S. device, comprises a mechanism provided with a related first antenna 3a that receives information transmitted by more satellites 31.

This mechanism can also process and standardize the received information making them available on a serial line, in NMEA code.

The information codified in this way concern the terrestrial physical units relative to the position of the same G.P.S. device on the terraqueous globe, and in particular, they refer to the longitude, the latitude, the temperature, the pressure, the date, the hour, the speed and the course.

The telephone apparatus 8, provided with a related second antenna 8a, is composed of a cellular telephone, whose carrier is on the 900 MHz frequency and whose power is within some Watt.

The transmitter-receiver radio 9, provided with a related third antenna 9a, uses a transceiving carrier included in V.H.F. wave range that varies from 27 to 30 MHz and whose power varies from 30 to 300 mWatt.

The first series of external sensors 5a, shown in the FIG. 2, includes a touch sensor 51, a weight sensor 52, an antenna sensor 53, a load monitoring circuit 55, at least one door opening-closing sensor 56, a volume monitoring circuit 57, an authorized presence checking circuit 58, and by a moving detecting circuit 59.

The touch sensor 51 is capable of detecting the touching of the motor vehicle 2 by at least one person.

Such a sensor is particularly sensible if attached to a motor vehicle 2 whose driving cab 35 and body 33 are made of metal.

The weight sensor 52 is usually applied to the seat 34 of the motor vehicle 2 and is able to detect the driver's weight difference, with some kilograms tolerance.

The antenna sensor 53 can detect various types of intentionally provoked breakdown of the antennas, first 3a, second 8a and third 9a, respectively, such as cutting of the cables connecting said antennas with relative devices, short circuit and the like.

The load monitoring circuit 55, by means of at least one load cell situated on the relative load platform 36 of the motor vehicle 2, can detect the load weight differences on the same load platform.

The door opening-closing sensor 56, usually situated in correspondence with hinge points between a door 32 of the motor vehicle and the relative doorpost, can detect the situation in which the relative door 32 is closed and/or opened.

The volume monitoring circuit 57, placed inside the container body 33, can detect the volume changes of the load inside the same body, by means of the constant monitoring of the load set-up.

The authorized presence checking circuit 58, positioned inside the driving cab, can inform the system 1 that an authorized person uses the motor vehicle 2.

This is made possible because the circuit 58 reads a code, given to the circuit 58 by the same authorized person by means of an electronic key, e.g. a magnetic card.

Information concerning not only the authorization code, but e.g. also anagraphic data of the person authorized to use the motor vehicle 2, technical-physical characteristics of the same motor vehicle, fundamental trip data such as the places met on the route, the trip length and planned stops, have been previously recorded on such magnetic card.

The moving detecting circuit 59, that is functionally connected to the touch sensor 51, to the weight sensor 52 and to the localization information detector 3, compares the information received from the devices connected thereto in order to continuously check whether the motor vehicle 2 is moved in a regular authorized way.

The second group of internal sensors 5b, shown in FIG. 3, includes a temperature sensor 61, an overturning sensor 62 and a push sensor 63.

The temperature sensor 61 is designed to detect abnormal temperature changes, provoked e.g. by a fire broken out in motor vehicle 2.

The overturning sensor 62 of the system 1 is designed to detect an abnormal position either of the box shaped casing 12 or of the motor vehicle 2.

The push sensor 63 of the system 1 is designed to detect the intensity of pushes received either by the box shaped casing 12 or by the related motor vehicle 2.

With reference to FIGS. 1 and 4, the group of memory units 6 and 7 is constituted by a first memory unit 6 and a second memory unit 7.

The first memory unit 6 is designed to register the data base for electronic cartography.

For example, such a data base contains territorial information concerning places, ways, motorways, crossings, tunnels, bridges, railways, harbours and airports.

The second memory unit 7 has recorded thereon a data base for the production of synthetized voices.

Such a data base contains information related to vocal synthesis of words and phrases concerning mainly the readings of the information contained in the first memory unit 6 for the electronic cartography.

As shown in the FIG. 4, the electronic unit 4 consists of: an amplifier/regenerator 16 for amplifying and regenerating the information received from the above mentioned localization information detector 3, a shift memory unit 18 for recording the last information received from the said detector 3, a comparator 19 for comparing two subsequent pieces of information received from the detector 3 by means of the memory unit 18, and a central processor 20.

By carrying out a series of preestablished instructions, such processor 20 can interpret and process the information received from the comparator 19, the conditions detected by external and internal sensor equipped devices, respectively 5*a* and 5*b*, as well as the data recorded in the first memory unit 6 and the second memory unit 7.

By interposition of the input modem 22 and decoder 23, the central processor 20 can also control the calls received either from the cellular telephone 8 or the transmitter-receiver radio 9.

A first timer 28 is also connected to the central processor.

By means of the timer, the central processor 20, on the basis of the data processed by it, can decide and activate either indirectly, through a decoder 25 and an output modem 24, or directly a calls control circuit 21 connected to both the telephone apparatus 8 and the transmitter-receiver radio 9.

It is to be pointed out that the modems 22, 24, the encoder 25 and the decoder 25 are integral parts of the electronic unit 4.

The electronic unit 4 comprises also:
- a proper operation check circuit 26 for the central processor 20;
- a switch circuit 27, placed between the comparator 19 and the output modem 24, that can connect directly the comparator 19 and the output modem 24 upon the consent received from the check circuit 26;
- a second timer 17 connected to the calls control circuit 21;
- a first socket 29 for input and output of a series of pre-established instructions and data destined to both the central processor 20 and the first and second memory units 6, 7, respectively;
- a second socket for input of information related to the central processor 20 activation and for the output of information related to the state of the said system 1.

The independent feeding section 13, connected to the electric feeding system (not shown) of the motor vehicle 2, includes a group of rechargeable, suitably dimensioned, batteries that can assure the system 1 independent operation for about six days in case of disconnection of the feeding section 13 from the same motor vehicle electric feeding.

With reference to FIGS. 1 and 2, the system 1 is also provided with a portable transceiver radio that can communicate radio-telephonically with the transmitter-receiver radio 9.

Such portable transceiver radio is also provided with a digital unit 71 that can exchange bidirectionally information with the central processor 20 when the portable transceiver radio 10 is inserted in a special seat 70 (external sensor 5*a*) made in the driving cab 35.

In such a position, the digital unit 71 records automatically the information related to the date, hour, last three positions detected by the localization information detector 3 and to the state of all the sensor equipped devices.

With reference to FIG. 2, externally to the box-shaped casing 12, the system 1 has also:
- a fourth antenna 3*b* connected to the G.P.S. device;
- a fifth antenna 8*b* connected to the cellular telephone 8;
- a sixth antenna 9*b* connected to transmitter-receiver radio 9;
- an antenna switching circuit 54 designed to continuously switch respectively, from the first antenna 3*a* to the fourth antenna 3*b* of the G.P.S. device, from the second antenna 8*a* to the fifth antenna 8*b* of the cellular telephone 8 and from the third antenna 9*a* to the sixth antenna 9*b* of the transmitter-receiver radio 9.

It is to be pointed out that the antenna sensor 53 detects also possible intentional break down of the said first 3*a*, second 8*a*, third 9*a*, fourth 3*b*, fifth 8*b* and sixth 9*b* antennas.

Still with reference to FIG. 2, the system 1 is also provided with a display means 80 (external sensor 5*a*), that is situated in the driving cab 35 and connected with the central processor 20, and that can display the main information processed by the central processor 20, such as the current date and hour, the speed of the motor vehicle, the present localization, the last registered localization data and the future positions, the expected arrival time, the information detected by the localization information detector 3 during the last hours, and the state of all the sensor equipped devices 5. Such a display means 80 has also an acoustic device.

With reference to FIG. 3, a strengthening and protection structure 14 having an opening 15 in correspondence with the antenna 3*a* of the G.P.S. device, is attached to the internal walls of the box-shaped casing 12 of the system 1.

In embodiment, as illustrated in FIGS. 3 and 4, the system 1 provides a second transmitter-receiver radio 11, equipped with at least one seventh antenna 11*a*, said transmitter-receiver radio 11 being connected to the calls control circuit 21 and designed to exchange bidirectionally the information with the central processor 20, by interposition of the input modem 22 and the decoder 23, and of the output 24 and the coder 25.

Said second transmitter-receiver radio 11 uses a transceiving carrier included in the U.H.F. wave-range at about 400 MHz.

In this embodiment the antenna 53 sensor can detect possible voluntary breakdown also of the seventh antenna 11*a*.

Moreover, the system 1 provides an eighth antenna 11*b* connected with the second transmitter-receiver radio 11.

Similarly to what has been already said, the switch circuit of the antenna 54 provides also for the continuous switching from the seventh antenna 11*a* to the eighth antenna 11*b*.

The antenna sensor 53 is also designed to detect possible voluntary breakdown of the last eighth antenna 11*b*.

A further embodiment provides the use of a second weight sensor 52*b* that can detect the motor vehicle 2 weight.

When the motor vehicle is motionless and there is no wind, the sensor 52*b* detects also the same motor vehicle weight with a tolerance of 35 kilogramme.

In another embodiment the system 1 provides at least one stationary control station, not illustrated in any figure, that can exchange the information with either the cellular telephone 8, or with the first V.H.F transmitter-receiver radio 9, or with the second U.H.F. transmitter-receiver radio 11.

FIG. 4 refers substantially the working of the system 1.

FIG. 4 shows the central processor 20 that is activated by a person authorized to use the motor vehicle, by means of reading a magnetic card, through the authorized presence check circuit 58 whose data are memorized in a non volatile memory unit (not shown) inside the central processor 20.

At that moment the system 1 is put into operation.

The G.P.S. device 3 begins to receive from the satellites 31 the localization information that, amplified and/or regenerated by the amplifying/regenerating device 16, are interpreted and made sequentially available, in standardized NMEA code, to the memory unit 18 and to the comparator 19.

The comparator 19 filters the identical localization information and sends to the central processor 20 only the different localization information issued by the G.P.S device.

The central processor 20 begins to compare the values received from the sensor equipped devices 5 with the relative reference threshold values in order to establish possible alarm situations.

The central processor 20, carrying out its series of predetermined information, can start the alarm procedure when the precise combinations of alarm situations are determined.

On that point, the central processor 20, on the basis of the localization information received from the G.P.S. device, can read from the memory unit 6, that contains the electronic territorial cartography, the route of the motor vehicle 2 with about 30 meters approximation.

The central processor 20, by reading its not volatile memory unit and the memory unit 7 of synthetized voices, can therefore form a talked word message containing basic information related to the motor vehicle 2 and the route it is covering.

The central processor 20, while keeping on carrying out its preestablished commands, can choose the telephone number of the Public Security Authorities and/or Assistance, on the basis of the predetermined priorities (e.g. if the motor vehicle is going on a motorway, the sequence, in the decreasing order, of the telephone numbers will be as follows: Motorway (Traffic) Police, Motorway Company Direct Line, Automobile Association Assistance, Carabinieri, and stationary operative station, if the latter is provided).

In this phase, the central processor 20 can activate the calls control circuit 21 and the cellular telephone 8, and can also call, with cadences established by the first timer 28, the chosen telephone number and transmit a talked word message.

At the same time and in the way identical to the activation of the cellular telephone 8, the central processor 20 provides also for sending the word message also through the V.H.F. transmitter-receiver radio 9.

The message is received, in the range of some kilometers, by the portable V.H.F. transceiver radio (not shown) placed in a stationary operative station.

As results from the type of sensor equipped devices 5 as well as from the variety of telephone numbers correspondent to the Public Authorities, it is obvious that the talked word message is automatically formed by the central processor 20 according to the its destination.

There are provided the informative messages concerning navigation data or the security data and the alarm messages of the following types: alarm for the theft of the motor vehicle 2, alarm for the accident of the motor vehicle 2, alarm for voluntary breakdown of the system 1, and the like.

When the alarm situation occurs, the system 1 is also able to decide independently, on the basis of the alarm type, the activation of the light and acoustic devices of the motor vehicle 2, or the devices (not shown) that can deactivate any leaving or movement of the same motor vehicle.

The latter devices comprise devices designed to stop the fuel delivery to the motor vehicle engine or devices activating the means stopping the same motor vehicle.

Information, adequately chosen and filtered, detected and processed by the central processor 20, are displayed by the display means 80 and are recorded on the digital unit 70 of the portable transceiver radio 10.

The key (identifying code) for the system 1 activation can be changed in any moment during operation of the system 1 by reception of a new key, in coded form, via the cellular telephone 8 and/or via the V.H.F. transmitter-receiver radio 9.

In fact, the codified key is read by the central processor 20 through the input modem 22 and the decoder 24.

When the central processor does not work perfectly, the decoder 23 sends automatically the decoded key to the calls control circuit 21.

Also the activation key is changeable by suitable devices that con be connected to the second socket 30 of the electronic unit 4.

In such a case the central processor 20 can transmit the codified activation key using the codifier 25, the output modem 24, the calls control circuit 21 and the cellular telephone 8 and/or the transmitter-receiver radio 9.

It is possible to exchange bidirectionally all types of data with the central processor 20 by the input 22 and output 24 modems.

It is possible to exchange e.g. the data related to the route the motor vehicle 2 must follow, data related to the information sequences performable by the same central processor 20, data related both to the data base of electronic cartography and data base of synthetized voices and data related to the navigation during the last hour stored by the central processor 20.

It is also possible to exchange bidirectionally the above mentioned data with special devices (not shown) and the central processor 20 through the first socket 29 and the second socket 30, respectively, with which the system 1 is provided.

In case of irregular operation of the central processor 20, detected by the good operation check circuit 26 for the same central processor 20, the system 1, by means of the switch circuit 27 intervention, can send, by the output modem 24, the information received and standardized by the G.P.S. device 3 and, directly, the states of the sensor equipped devices 5.

These data are sent to the calls control circuit 21 that provides, through to the second timer 17, for dialling a prefixed number with the circuit 8 and for transmitting a coded message through the circuit 8 and the V.H.F transmitter-receiver radio 9.

In the embodiment providing the second U.H.F. transmitter-receiver radio 11, the operative procedure of the whole system 1 is substantially the same, while the action range and the system 1 flexibility increase considerably.

In fact, by means of such a second transmitter-receiving radio 11, the system 1 can talk with a stationary operative station in the range of dozens of kilometers.

INDUSTRIAL APPLICABILITY

The industrial applicability of the claimed invention results well clear both from the need that today exists for antitheft systems, which must be reliable and effective, and from the advantages that the present invention brings about.

The main advantage of the present invention lies in providing an antitheft system for motor vehicle that is able to recognize independently abnormal conditions of the motor vehicle, and that accordingly produce a correspondent talked word message and, therefore, transmit it by a telephone apparatus and/or by a radio-frequency transmitter-receiver radio.

Another advantage of the present invention is that it provides an antitheft system capable of sending the message near the motor vehicle or in the range of some kilometers as well as for the bigger distances so as to be picked up in the whole national territory.

Further important advantage of the present invention is that it provides an antitheft system that is capable to transmit talked word messages to the public security organizations, therefore avoiding a stationary station dedicated thereto and on work the whole day long.

Still further advantage of the present invention lies in the fact that it provides an antitheft system integrated with security functions either for the driver or for the same motor vehicle due to the antitheft system possibility to furnish, when requested or continuously, general and navigation information either to the driver or to a possible stationary check station.

From all what above it appears that this antitheft system is destined to encounter great favour and to be produced on industrial basis.

Moreover the subject invention has been described, with reference to the enclosed drawings, only as a mere example, not limitative, therefore it is obvious that all the modifications o variants suggested either by practice or the activation and usage thereof are anyway within the following claims.

I claim:

1. An antitheft system integrated with functions of security, information and navigation based on electronic cartography, vocal synthesis and radio telecommunication, with said system (1) partially placed in a box-shaped casing (12) and fastened to a motor vehicle (2) characterized in that it comprises the following:

a localization information detector (3) provided with at least a first antenna (3a) and including a device adapted to receive information from a satellite system (31) and to process the information concerning physical terrestrial magnitudes related to a global position of said localization information detector (3), said information related to longitude, latitude, temperature, pressure, date, time, speed and route;

a telephone apparatus (8) provided with at least a second antenna (8a);

a plurality of sensor equipped devices (5), subdivided in a first group (5a,) of sensors external to said box-shaped casing (12), and in a second group of sensors internal to said box-shaped casing (12), with said sensor equipped devices (5) destined to detect determined conditions;

a series of mass memory units (6, 7) in which a data base for electronic cartography and a data base of synthesized voiced words are stored;

an electronic unit (4), connected functionally to said localization information detector, telephone apparatus, plurality of sensor equipped devices and series of mass memory units, for controlling the localization information detector, telephone apparatus, plurality of sensor equipped devices and series of mass memory units as well as signals respectively received and sent by them, said electronic unit capable of retrieving information from said mass memory units (6, 7) and forming a word message which is sent via said telephone apparatus;

an independent feeding section (13) for feeding the electronic unit (4) and said localization information detector, telephone apparatus, plurality of sensor equipped devices and series of mass memory units.

2. The antitheft system, according to claim 1, characterized in that said electronic control unit (4) comprises:

an amplifier/regenerator (16) for amplifying or regenerating information received from said localization information detector(3);

a memory (18) for recording the information received from said localization information detector (3);

a comparator (19) for the comparison of two consecutive pieces of information received from said localization information detector (3) through said memory (19);

a central processor (20) that, by performing a series of preestablished commands, is able to interpret and process the information received from said comparator (19), the states detected by said external and internal sensors (5a, 5b), data recorded in said series of mass memory units (6,7) as well as the calls received through interposition of an input modem (22) and a first decoder (23), from said telephone apparatus (8), with said central processor (20) capable also, on the basis of interpreted data and by means of a first call timer (28), of deciding and activating either indirectly, by a second decoder (25) and an output modem (24), or directly, a calls control circuit (21), connected to said telephone apparatus (8);

a proper operation check circuit (26) for said central processor (20);

a switching circuit (27) placed between said comparator (19) and said output modem (24) and connected to said check circuit (26);

a second timer (17) connected to said calls control circuit (21).

3. The antitheft system, according to claim 2, characterized in that said electronic control unit (4) further comprises:

a first socket (29) for the input and output of the series of preestablished commands and of data addressed to the said central processor (20) and to said memory units (6,7);

a second socket (30) for the input of information related to the activation of the said central processor (20) and for the output of information related to the state of said system (1).

4. The antitheft system, according to claim 1 characterized in that said first group of external sensors (5a), connected with said electronic unit (4), is formed by at least a touch sensor (51) sensitive to touching said motor vehicle (2).

5. The antitheft system, according to claim 1 characterized in that said first group of external sensors (5a), connected with said electronic unit (4), is formed by a weight sensor (52) adapted to detect the weight change of a driver on a seat (34) of said motor vehicle (2).

6. The antitheft system, according to claim 1 characterized in that said first group of external sensors (5a), connected with said electronic unit (4), is formed by an antenna sensor (53) adapted to detect possible voluntary breakdown of the said first, and second, antennas, (3a, 8a,) respectively.

7. The antitheft system, according to claim 1 characterized in that said first group of external sensors (5a), connected with the said electronic unit (4), is formed by at least one load monitoring circuit (55), adapted to detect the changes of the weight of a load into a container body (33) of said motor vehicle (2).

8. The antitheft system, according to claim 1 characterized in that said first group of external sensors (5a), connected with said electronic unit (4), is formed by at least one door opening-closing sensor (56) adapted to recognize when a related door (32) of said motor vehicle (2) is opened or closed.

9. The antitheft system, according to claim 1 characterized in that said first group of external sensors (5a), connected with said electronic unit (4), is formed by a volume monitoring circuit (57) fit to detect the changes of volume of a load inside to a container body (33).

10. The antitheft system, according to claim 1 characterized in that said first group of external sensors (5a), connected with said electronic unit (4), is formed by a circuit (58) checking the authorized presence and adapted to recognize, by a code, the presence of a person authorized to use said motor vehicle (2).

11. The antitheft system, according to claim 1 characterized in that said first group of external sensors (5a), connected with said electronic unit (4), is formed by:
- at least one touch sensor (51) sensitive to said motor vehicle (2) being touched;
- a weight sensor (52) adapted to detect the weight changes of a driver on a seat (34) of said motor vehicle (2);
- a moving detecting circuit (59) capable of detecting the abnormal movement of said motor vehicle (2) by comparing the signals detected by said touch sensor (51), said weight sensor (52) and said localization information detector (3).

12. The antitheft system according to claim 1, characterized in that said first group of external sensors (5a), connected with said electronic unit (4) includes:
- at least one touch sensor (51) sensitive to said motor vehicle (2) being touched;
- a weight sensor (52) adapted to detect the weight changes of a driver on a seat (34) of said motor vehicle (2);
- an antenna sensor (53) adapted to detect possible voluntary breakdown of said first, and second antennas, (3a, 8a,) respectively;
- at least one load monitoring circuit (55), adapted to detect the changes of weight of a load inside a container body (33) of said motor vehicle (2);
- at least one door opening-closing sensor (56) adapted to recognize when a related door (32) of said motor vehicle (2) is opened or closed;
- a volume monitoring circuit (57) fit to detect the changes of volume of the load inside the container body (33):
- a check circuit (58) for checking an authorized presence and adapted to recognize, by a code, the presence of a person authorized to use said motor vehicle (2);
- a moving detecting circuit (59) capable of detecting the abnormal movement of said motor vehicle (2) by comparing the signals detected by said touch sensor (51), said weight sensor (52) and said localization information detector (3).

13. The antitheft system, according to claim 1 characterized in that said second group of internal sensors (5b), connected to said electronic unit (4), comprises a temperature sensor (61).

14. The antitheft system, according to claim 1 characterized in that said second group of internal sensors (5b), connected to said electronic unit (4), comprises a turn over sensor (62) sensitive to said box-shaped casing (12) and said motor vehicle (2) being overturned.

15. The antitheft system, according to claim 1 characterized in that said second group of internal sensors (5b), connected to said electronic unit (4), comprises a push sensor sensitive to said box-shaped casing (12) and said motor vehicle (2) being pushed.

16. The antitheft system, according to claim 1 characterized in that said second group of internal sensors (5b), connected to said electronic unit (4), comprises:
- a temperature sensor (61);
- a turn over sensor (62) for said box-shaped casing (12) and said motor vehicle (2).
- a push sensor for said box-shaped casing (12) and for said motor vehicle (2).

17. The antitheft system, according to claim 1 characterized in that said mass memory units (6,7) comprises a first memory unit (6) in which the data base for electronic cartography is stored.

18. The antitheft system, according to claim 17 characterized in that said mass memory units (6,7) comprises a second memory unit (7) in which the data base of synthetized voices is stored.

19. The antitheft system, according to claim 1 characterized in that said telephone apparatus (8) includes a portable cellular telephone.

20. The antitheft system, according to claim 1 characterized in that it comprises also:
- a fourth antenna (3b) connected to the said localization information detector (3);
- a fifth antenna (8b) connected with the said telephone apparatus (8);
- a switching antenna circuit (54) adapted to switch continuously from said first antenna (3a) to the said fourth antenna (3b), from said second antenna (8a) to said fifth antenna (8b).

21. The antitheft system, according to claim 20, characterized in that it comprises also an antenna sensor (53) adapted to detect possible voluntary breakdown of said first, second, fourth, and fifth antennas (3a, 8a, 3b, 8b,) respectively.

22. The antitheft system, according to claim 1 further comprising an antenna sensor (53) adapted to detect possible voluntary breakdown of said antennas first (3a), and second (8a), antennas.

23. The antitheft system, according to claim 1 further comprising a display means (80), placed in a driving cab (35) of said motor vehicle (2), provided with an acoustic device and adapted to display the information of the electronic unit (4) to which it is connected.

24. The antitheft system, according to claim 1 characterized in that a strengthening and protection structure (14), having an opening (15) in correspondence with said localization information detector (3), is fixed to the internal walls of said box-shaped casing (12).

25. An antitheft system integrated with functions of security, information and navigation based on electronic cartography, vocal synthesis and radio telecommunication, with said system (1) partially placed in a box-shaped casing (12) and fastened to a motor vehicle (2), characterized in that it comprises the following:
- a localization information detector (3) provided with at least a first antenna (3a) and including a device adapted to receive information from a satellite system (31) and to process the information concerning physical terrestrial magnitudes related to a global position of said localization information detector (3), said information related to longitude, latitude, temperature, pressure, date, time, speed and route;
- a telephone apparatus (8) provided with at least a second antenna (8a);

a transmitter-receiver radio (9) provided with at least a third antenna (9a);

a plurality of sensor equipped devices (5), subdivided in a first group (5a) of sensors external to said box-shaped casing (12), and in a second group of sensors internal to said box-shaped casing (12), with said sensor equipped devices (5) having a task of detecting determined conditions;

a series of mass memory units (6, 7) in which a data base for electronic cartography and a data base of synthesized voiced words are stored;

an electronic unit (4), connected functionally to said localization information detector, telephone apparatus, transmitter-receiver radio, plurality of sensor equipped devices and series of mass memory units, for controlling the localization information detector, telephone apparatus, transmitter receiver radio, plurality of sensor equipped devices and series of mass memory units as well as signals respectively received and sent by them, said electronic unit capable of retrieving information from said mass memory units (6, 7) and forming a word message which is sent via said telephone apparatus;

an independent feeding section (13) for feeding the electronic unit (4) and said localization information detector, telephone apparatus, transmitter-receiver radio, plurality of sensor equipped devices and series of mass memory units.

26. The antitheft system, according to claim 25 characterized in that said electronic control unit (4) comprises:

an amplifier/regenerator (16) for amplifying or regenerating information received from said localization information detector (3);

a memory (18) for recording the information received from said localization information detector (3);

a comparator (19) for the comparison of two consecutive pieces of information received from said localization information detector (3) through said memory (18);

a central processor (20) that, by performing a series of preestablished commands, is able to interpret and process the information received from said comparator (19), the states detected by said external and internal sensors (5a, 5b), data recorded in said series of mass memory units (6,7) as well as the calls received, through interposition of an input modem (22) and a first decoder (23), from said telephone apparatus (8) and from said transmitter-receiver radio (9), with said central processor (20) capable also, on the basis of interpreted data and by means of a first call timer (28), of deciding and activating either indirectly, by a second decoder (25) and an output modem (24), or directly, a calls control circuit (21), connected to both said telephone apparatus (8) and said transmitter-receiving radio (9);

a proper operation check circuit (26) for said central processor (20);

a switching circuit (27) placed between said comparator (19) and said output modem (24) and connected to said check circuit (26);

a second timer (17) connected to said calls control circuit (21).

27. The antitheft system, according to claim 26, characterized in that said electronic control unit (4) further comprises also:

a first socket (29) for the input and output of the series of preestablished commands and of data addressed to said central processor (20) and to said memory units (6,7);

a second socket (30) for the input of information related to the activation of said central processor (20) and for the output of the information related to the state of said system (1).

28. The antitheft system, according to claim 26, characterized in that it comprises also a second transmitter-receiver radio (11), provided with at least one seventh antenna (11a), connected with said calls control circuit (21) and fit to exchange bidirectionally information with the central processor (20), by interposition of said input modem (22) and said first decoder (23), and of said output modem (24) and said second decoder (25).

29. The antitheft system, according to claim 28, characterized in that said second transmitter-receiver radio (11) is an U.H.F. transmitter-receiver radio.

30. The antitheft system, according to claim 28, characterized in that it comprises also:

an eighth antenna (11b) connected with said second transmitter-receiver radio (11);

an antenna switching circuit (54) adapted to switch continuously from said third antenna (11a) to said eighth antenna (11b).

31. The antitheft system, according to claim 30, characterized in that it comprises also an antenna sensor (53) adapted to detect possible voluntary breakdown of said first (3a), second (8a), third (9a), fourth (3b), fifth (8b), sixth (9b), seventh (11a), and eighth (11b) antennas.

32. The antitheft system, according to claim 25, characterized in that said first group of external sensors (5a), connected with said electronic unit (4), is formed by at least one touch sensor (51) sensitive to touching said motor vehicle (2).

33. The antitheft system, according to claim 25, characterized in that said first group of external sensors (5a), connected with said electronic unit (4), is formed by a weight sensor (52) adapted to detect the weight change of a driver on a seat (34) of said motor vehicle (2).

34. The antitheft system, according to claim 25, characterized in that said first group of external sensors (5a), connected with said electronic unit (4), is formed by an antenna sensor (53) adapted to detect possible voluntary breakdown of said first, second, and third antennas, (3a, 8a,9a) respectively.

35. The antitheft system, according to claim 25, characterized in that said first group of external sensors (5a), connected with the said electronic unit (4), is formed by at least one load monitoring circuit (55), adapted to detect the changes of the weight of a load into a container body (33) of said motor vehicle (2).

36. The Antitheft system, according to claim 25, characterized in that said first group of external sensors (5a), connected with said electronic unit (4), is formed by at least one door opening-closing sensor (56) adapted to recognize when a related door (32) of said motor vehicle (2) is opened or closed.

37. The antitheft system, according to claim 25, characterized in that said first group of external sensors (5a), connected with the said electronic unit (4), is formed by a volume monitoring circuit (57) fit to detect the changes of volume of a load inside of the container body (33).

38. The antitheft system, according to claim 25, characterized in that said first group of external sensors (5a), connected with the said electronic unit (4), is formed by a circuit (58) checking an authorized presence and adapted to recognize, by a code, the presence of a person authorized to use said motor vehicle (2).

39. The antitheft system, according to claim 25, characterized in that said first group of external sensors (5a), connected with said electronic unit (4), is formed by:

at least one touch sensor (51) sensitive to said motor vehicle (2) being touched;

a weight sensor (52) adapted to detect the weight changes of a driver on a seat (34) said motor vehicle (2);

a moving detecting circuit (59) capable of detecting the abnormal movement of said motor vehicle (2) by comparing the signals detected by said touch sensor (51), said weight sensor (52) and said localization information detector (3).

40. The antitheft system, according to claim 25, characterized in that said first group of external sensors (5a), connected with the said electronic unit (4,) includes:

at least one touch sensor (51) sensitive to said motor vehicle (2) being touched;

a weight sensor (52) adapted to detect the weight changes of a driver on a seat (34) of said motor vehicle (2);

an antenna sensor (53) adapted to detect possible voluntary breakdown of said first, second and third antennas, (3a, 8a, 9a) respectively;

at least one load monitoring circuit (55), adapted to detect the changes of weight of a load inside the container body (33) of said motor vehicle (2);

at least one door opening-closing sensor (56) adapted to recognize when a related door (32) of said motor vehicle (2) is opened or closed;

by a volume monitoring circuit (57) fit to detect the changes of volume of the load inside the container body (33);

a check circuit (58) for checking an authorized presence and adapted to recognize, by a code, the presence of a person authorized to use said motor vehicle (2);

a moving detecting circuit (59) capable of detecting the abnormal movement of said motor vehicle (2) by comparing the signals detected by said touch sensor (51), said weight sensor (52) and said localization information detector (3).

41. The antitheft system, according to claim 25, characterized in that said second group of internal sensors (5b), connected to said electronic unit (4), comprises a temperature sensor (61).

42. The antitheft system, according to claim 25, characterized in that said second group of internal sensors (5b), connected to said electronic unit (4), comprises a turn over sensor (62) sensitive to said box-shaped casing (12) and said motor vehicle (2) being overturned.

43. The antitheft system, according to claim 25, characterized in that said second group of internal sensors (5b), connected to said electronic unit (4), comprises a push sensor sensitive to said box-shaped casing (12) and said motor vehicle (2) being pushed.

44. The antitheft system, according to claim 25, characterized in that said second group of internal sensors (5b), connected to said electronic unit (4), comprises:

a temperature sensor (61);

a turn over sensor (62) for said box-shaped casing (12) and said motor vehicle (2);

a push sensor for said box-shaped casing (12) and for said motor vehicle (2).

45. The antitheft system, according to claim 25, characterized in that said mass memory units (6,7) has a first memory unit (6) in which the data base for electronic cartography is stored.

46. The antitheft system, according to claim 25, characterized in that said mass memory units (6,7) has a second memory unit (7) in which the data base of synthesized voices is stored.

47. The antitheft system, according to claim 25, characterized in that said telephone apparatus (8) includes a portable cellular telephone.

48. The antitheft system, according to claim 25, characterized in that said transmitter-receiver radio (9) is a V.H.F. transmitter-receiver radio.

49. The antitheft system, according to claim 25, characterized in that it comprises also a portable transceiver radio (10) capable of exchanging information with said transmitter-receiver radio (9).

50. The antitheft system, according to claim 49, characterized in that said portable transceiver radio (10) is provided with a digital unit (71) capable of exchanging bidirectionally information with said electronic unit (4), when said portable transceiver radio (10) is inserted in a special seat (70) in a driving cab (35) of said motor vehicle (2).

51. The antitheft system, according to claim 49, characterized in that said portable transceiver radio (10) is a V.H.F. transceiver radio.

52. The antitheft system, according to claim 25, characterized in that it comprises also:

a fourth antenna (3b) connected to said localization information detector (3);

a fifth antenna (8b) connected with said telephone apparatus (8);

a sixth antenna (9b) connected to said transmitter-receiver radio (9);

a switching antenna circuit (54) adapted to switch continuously from said first antenna (3a) to said fourth antenna (3b), from said second antenna (8a) to said fifth antenna (8b) and from said third antenna (9a) to said sixth antenna (9b).

53. The antitheft system, according to claim 52, characterized in that it comprises also an antenna sensor (53) adapted to detect possible voluntary breakdown of said first, second, third, fourth, fifth and sixth antennas (3a, 8a, 9a, 3b, 8b, 9b) respectively.

54. The antitheft system, according to claim 25, characterized in that said first group of external sensors (5a), connected with said electronic unit (4), is formed by an antenna sensor (53) fit to detect possible voluntary breakdown of said antennas, first (3a), second (8a), third (9a), and seventh (11a).

55. The antitheft system, according to claim 25, characterized in that it comprises also a display means (80), placed in a driving cab (35) of said motor vehicle (2), provided with an acoustic device and adapted to display the information of the electronic unit (4) to which it is connected.

56. The antitheft system, according to claim 25, characterized in that a strengthening and protection structure (14), having an opening (15) in correspondence with said localization information detector (3), is fixed to the internal walls of said box-shaped casing (12).

* * * * *